United States Patent Office.

BENJAMIN V. BETTERTON, OF PIQUA, OHIO.

Letters Patent No. 76,882, dated April 21, 1868.

IMPROVED STONE PAINT.

*The Schedule referred to in these Letters Patent and making part of the same.*

TO ALL WHOM IT MAY CONCERN:

Be it known that I, BENJAMIN V. BETTERTON, of Piqua, in the county of Miami, and State of Ohio, have invented a new and improved Stone Paint.

To enable others skilled in the art to make and use my invention, I will proceed to describe its manufacture and use.

I take, say, fifty pounds of shale or calcareous earth, to which add eight ounces of white Burgundy pitch or rosin, and then add about five quarts of linseed-oil, to prepare it for grinding. I put the rosin or Burgundy pitch and oil together in a pot, and bring it to a gentle heat till the rosin or pitch melts. I then put in enough of benzole or turpentine to properly thin it, when I mix this compound of rosin and oil with the shale, and grind the whole together to the consistency of white lead ground in oil, when it is ready for use in its natural color, which is a dark free-stone color. This compound can be colored to suit the taste, by the use of common paints added to it.

To prepare the shale for use, I take a common flour-barrel which will hold about five hundred pounds of the shale, on which I pour water to the amount of three or four buckets, which escapes through holes in the bottom of the barrel, and washes out the quicksand and other foreign matter. I then stop up the holes in the bottom of the barrel, and take four gallons of water and add five ounces of muriate of tin, which I pour in the barrel of shale, which I let stand about two days, and then put it out to dry. I then run the dried shale through a crush-mill, when it is ready for the compound. For light colors, the Burgundy pitch is better than rosin, and for darker colors take rosin.

This compound or "stone paint" can be manufactured at a cost of five cents per pound. This paint produces a durable, hard, glossy finish, and can be put on top of whitewash.

What I claim as my invention, and desire to secure by Letters Patent, is—

The compound above described, for the purposes above mentioned.

BENJ'N V. BETTERTON.

Witnesses:
   S. B. GARVY,
   J. F. McKENNEY.